(12) United States Patent
Langenderfer et al.

(10) Patent No.: US 12,365,267 B2
(45) Date of Patent: Jul. 22, 2025

(54) PREDICTED COOLING CONTROL SYSTEMS AND METHODS FOR ELECTRIC VEHICLES

(71) Applicant: Cummins Inc., Columbus, IN (US)

(72) Inventors: David J. Langenderfer, Columbus, IN (US); Bin L Liu, Wuhan (CN); Tony Qin, Beijing (CN)

(73) Assignee: Cummins Inc., Columbus, IN (US)

( * ) Notice: Subject to any disclaimer, the term of this patent is extended or adjusted under 35 U.S.C. 154(b) by 907 days.

(21) Appl. No.: 17/292,789

(22) PCT Filed: Jan. 14, 2019

(86) PCT No.: PCT/CN2019/071546
§ 371 (c)(1),
(2) Date: May 11, 2021

(87) PCT Pub. No.: WO2020/146969
PCT Pub. Date: Jul. 23, 2020

(65) Prior Publication Data
US 2021/0394644 A1    Dec. 23, 2021

(51) Int. Cl.
*B60L 58/00*    (2019.01)
*B60K 11/00*    (2006.01)
(Continued)

(52) U.S. Cl.
CPC ............ *B60L 58/26* (2019.02); *B60K 11/00* (2013.01); *B60W 40/12* (2013.01);
(Continued)

(58) Field of Classification Search
CPC ...... B60L 58/26; B60L 2260/56; B60K 11/00; B60K 11/02; B60K 2001/006; B60K 1/00;
(Continued)

(56) References Cited

U.S. PATENT DOCUMENTS 5,255,733 A * 10/1993 King .................. F01P 7/165
165/41
9,160,213 B2 * 10/2015 Schultz ................ B60L 3/0061
(Continued)

FOREIGN PATENT DOCUMENTS

CN    101446343 A    6/2009
CN    102442199 A    5/2012
(Continued)

OTHER PUBLICATIONS

International Preliminary Report on Patentability received for PCT Patent Application No. PCT/CN2019/071546, mailed on Jul. 29, 2021, 5 pages.
(Continued)

*Primary Examiner* — Peter D Nolan
*Assistant Examiner* — Peter Y Ning
(74) *Attorney, Agent, or Firm* — Faegre Drinker Biddle & Reath LLP (57) ABSTRACT

A system is provided for performing a predicted cooling operation for an electric vehicle (102) using a processor (122), and includes a vehicle monitoring unit (128) configured to monitor one or more vehicle characteristics related to the electric vehicle (102). The one or more vehicle characteristics include look-ahead demand information of one or more components of the electric vehicle (102). A cooling controller (126) is configured to communicate with the vehicle monitoring unit (128) and determine the look-ahead demand information based on at least one of: navigational information, thermal information, and environment information associated with the electric vehicle (102). The cooling controller (126) is configured to generate a cooling command based on the look-ahead demand information and perform the predicted cooling operation based on the cool-
(Continued)

ing command by over-cooling the one or more components of the electric vehicle (102).

28 Claims, 8 Drawing Sheets (51) Int. Cl.
   *B60L 58/26* (2019.01)
   *B60W 40/12* (2012.01)
(52) U.S. Cl.
   CPC . *B60W 2510/087* (2013.01); *B60W 2510/246* (2013.01); *B60W 2552/00* (2020.02)
(58) Field of Classification Search
   CPC .......... B60W 40/12; B60W 2510/087; B60W 2510/246; B60W 2552/00; Y02T 90/16; Y02T 10/70
   See application file for complete search history.

(56) References Cited

U.S. PATENT DOCUMENTS

| | | | | |
|---|---|---|---|---|
| 9,643,515 | B2* | 5/2017 | Wagner | B60L 58/10 |
| 2012/0222438 | A1* | 9/2012 | Osaka | B60H 1/00764 62/126 |
| 2018/0111486 | A1* | 4/2018 | Kwon | B60K 11/00 |
| 2018/0141458 | A1* | 5/2018 | Jammoul | H01M 10/63 |
| 2018/0202347 | A1* | 7/2018 | Brinkmann | F01P 7/16 |

FOREIGN PATENT DOCUMENTS

| | | | | |
|---|---|---|---|---|
| CN | 102510813 | | 6/2012 | |
| CN | 102510813 A | | 6/2012 | |
| CN | 103253124 A | * | 8/2013 | ............. B60L 1/003 |
| CN | 103380048 A | | 10/2013 | |
| CN | 103448561 A | | 12/2013 | |
| CN | 107554340 A | | 1/2018 | |
| CN | 107962979 A | | 4/2018 | |
| CN | 108357333 A | | 8/2018 | |
| CN | 108859810 A | | 11/2018 | |
| DE | 102014008380 A1 | | 12/2014 | |
| DE | 102014201265 A1 | | 7/2015 | |
| EP | 2508373 A1 | | 10/2012 | |
| JP | 2013168614 A | | 8/2013 | |
| WO | 2011013018 A1 | | 2/2011 | |

OTHER PUBLICATIONS

International Search Report and Written Opinion issued by the National Intellectual Property Administration, PRC, dated Apr. 26, 2019, for International Application No. PCT/CN2019/071546; 6 pages.

* cited by examiner

PREDICTED COOLING CONTROL SYSTEMS AND METHODS FOR ELECTRIC VEHICLES

RELATED APPLICATIONS

This application is a national stage filing of International Application No. PCT/CN2019/071546, filed Jan. 14, 2019, the entire disclosure of which is hereby expressly incorporated herein by reference in its entirety.

TECHNICAL FIELD

This disclosure relates generally to methods and systems for controlling electric vehicles, and more particularly to controlling cooling operation of the electric vehicles.

BACKGROUND

A cooling control system can be used for both a pure electric vehicle (EV) and/or a hybrid electric vehicle (HEV) having an electric motor and an internal combustion engine (ICE). The term "electric vehicles," as used herein, refers to hybrid and/or pure electric vehicles which provide an alternative to conventional fuel engine systems for either supplementing or completely replacing the engine systems, such as ICEs. In one example, an electric vehicle is an extended range electric vehicle (EREV). In the EREV, primary electric drive is achieved with a battery or related rechargeable energy storage system (RESS) that acts as a direct current (DC) voltage source to a motor, generator or transmission that in turn can be used to provide the energy needed to rotate one or more of the vehicle's wheels. When the electrical charge from the RESS has been depleted, backup power may come from the ICE to provide auxiliary onboard electrical energy generation.

During operation, one or more components of the electric vehicle, such as high-power electrification components, can release a large amount of heat that causes damage to the electric vehicle. A cooling control system can be used to control cooling operation of the electric vehicle during a mission for the electric vehicle. For example, the cooling control system can be used to maintain powertrain components, such as electric or traction motors, within their thermal operational range. In certain cases, increasing demands of the powertrain components can cause overheating of the powertrain components and/or other components, such as battery packs, in the electric vehicle. Further, there can be unwanted response delays in control signals generated by the cooling control system, thereby causing inefficient controls during the cooling operation.

As such, improvements are needed to provide proper and efficient cooling controls to keep the components of the electric vehicle within the thermal operational range. Accordingly, there are opportunities to develop enhanced cooling control systems and methods that can more efficiently control the cooling operation of the electric vehicles.

SUMMARY

In one embodiment of the present disclosure, a system is provided for performing a predicted cooling operation for an electric vehicle using a processor. The system includes a vehicle monitoring unit configured to monitor one or more vehicle characteristics related to the electric vehicle. The one or more vehicle characteristics include look-ahead demand information of one or more components of the electric vehicle. The system further includes a cooling controller configured to communicate with the vehicle monitoring unit and determine the look-ahead demand information based on at least one of: navigational information, thermal information, and environment information associated with the electric vehicle. The cooling controller is configured to generate a cooling command based on the look-ahead demand information and perform the predicted cooling operation based on the cooling command by over-cooling the one or more components of the electric vehicle.

In one example, the over-cooling is performed using the cooling command that includes data representative of a target cooling temperature of at least one electric device of the electric vehicle. The target cooling temperature is set lower than a nominal temperature of the at least one electric device.

In another example, the look-ahead demand information is representative of a future power demand needed by the electric vehicle. In a variation, the cooling controller is configured to calculate the future power demand based on a current power demand of the electric vehicle and at least one of: the navigational information, the thermal information, and the environment information.

In yet another example, the cooling controller is configured to determine the thermal information associated with the electric vehicle using a temperature of at least one electric device of the electric vehicle.

In still another example, the cooling controller is configured to determine the navigational information associated with the electric vehicle using information received from a positioning system.

In yet still another example, the cooling controller is configured to determine the environment information associated with the electric vehicle using mapping information.

In another embodiment of the present disclosure, a method is provided for performing a cooling operation for an electric vehicle using a processor. The method includes monitoring one or more vehicle characteristics related to the electric vehicle, the one or more vehicle characteristics including look-ahead demand information of one or more components of the electric vehicle, determining the look-ahead demand information using at least one of: navigational information, thermal information, and environment information associated with the electric vehicle, generating a cooling command using the look-ahead demand information, and performing the cooling operation using the cooling command by over-cooling the one or more components of the electric vehicle.

In one example, the method further includes including, in the cooling command, data representative of a target cooling temperature of at least one electric device of the electric vehicle for performing the over-cooling, and setting the target cooling temperature lower than a nominal temperature of the at least one electric device.

In another example, the method further includes including, in the look-ahead demand information, data representative of a future power demand needed by the electric vehicle. In a variation, the method further includes calculating the future power demand based on a current power demand of the electric vehicle and at least one of: the navigational information, the thermal information, and the environment information.

In yet another example, the method further includes determining the thermal information associated with the electric vehicle using a temperature of at least one electric device of the electric vehicle, determining the navigational information associated with the electric vehicle using information received from a positioning system, and determining the environment information associated with the electric vehicle using mapping information.

In yet another embodiment of the present disclosure, a system is provided for performing a cooling operation for an electric vehicle using a processor. The system includes a predicted power unit configured to generate predicted thermal information using look-ahead demand information, an electrification thermal management (ETM) unit configured to receive the predicted thermal information from the predicted power unit and generate a control signal using the predicted thermal information and a thermal feedback signal, and an ETM control unit configured to receive the control signal from the ETM unit and perform the cooling operation on one or more components of the electric vehicle using the control signal.

In one example, the predicted thermal information includes at least one of: a predicted engine power signal of the electric vehicle and a predicted electrified power signal of the electric vehicle. In a variation, the predicted engine power signal includes information about a future engine power demand needed by the electric vehicle using at least one of: navigational information, thermal information, and environment information. In another variation, the predicted electrified power signal includes information about a future electrified power demand needed by the electric vehicle using at least one of: navigational information, thermal information, and environment information.

In another example, the system further includes an electrification component monitoring unit configured to generate the thermal feedback signal including data representative of thermal information of one or more components of the electric vehicle. In a variation, the data is representative of a condition whether a current temperature of a corresponding component of the electric vehicle is equal to a target cooling temperature. In another variation, the ETM control unit is configured to generate a status request signal that instructs the electrification component monitoring unit to perform a monitoring operation of the one or more components of the electric vehicle. In yet another variation, the electrification component monitoring unit responds to the status request signal by collecting status information relating to the one or more components of the electric vehicle to assess an efficiency of the cooling operation. In still another variation, the electrification component monitoring unit is configured to generate the thermal feedback signal using the status information.

In still another embodiment of the present disclosure, a method is provided for performing a cooling operation for an electric vehicle using a processor. The method includes generating predicted thermal information using look-ahead demand information, generating a control signal using the predicted thermal information and a thermal feedback signal, and performing the cooling operation on one or more components of the electric vehicle using the control signal.

In one example, the method further includes including, in the predicted thermal information, at least one of: a predicted engine power signal of the electric vehicle and a predicted electrified power signal of the electric vehicle. In a variation, the method further includes including, in the predicted engine power signal, information about a future engine power demand needed by the electric vehicle using at least one of: navigational information, thermal information, and environment information. In another variation, the method further includes including, in the predicted electrified power signal, information about a future electrified power demand needed by the electric vehicle using at least one of: navigational information, thermal information, and environment information.

In another example, the method further includes generating the thermal feedback signal using data representative of thermal information of one or more components of the electric vehicle.

In yet another example, the method further includes comparing a current temperature of a corresponding component of the electric vehicle with a target cooling temperature.

In still another example, the method further includes generating a status request signal that initiates a monitoring operation of the one or more components of the electric vehicle. In a variation, the method further includes responding to the status request signal by collecting status information relating to the one or more components of the electric vehicle to assess an efficiency of the cooling operation. In another variation, the method further includes generating the thermal feedback signal using the status information.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above mentioned and other features and objects of this disclosure, and the manner of attaining them, will become more apparent and the disclosure itself will be better understood by reference to the following description of an embodiment of the disclosure taken in conjunction with the accompanying drawings, wherein.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION

The embodiment disclosed below is not intended to be exhaustive or limit the disclosure to the precise form disclosed in the following detailed description. Rather, the embodiment is chosen and described so that others skilled in the art may utilize its teachings. One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Figure 1:
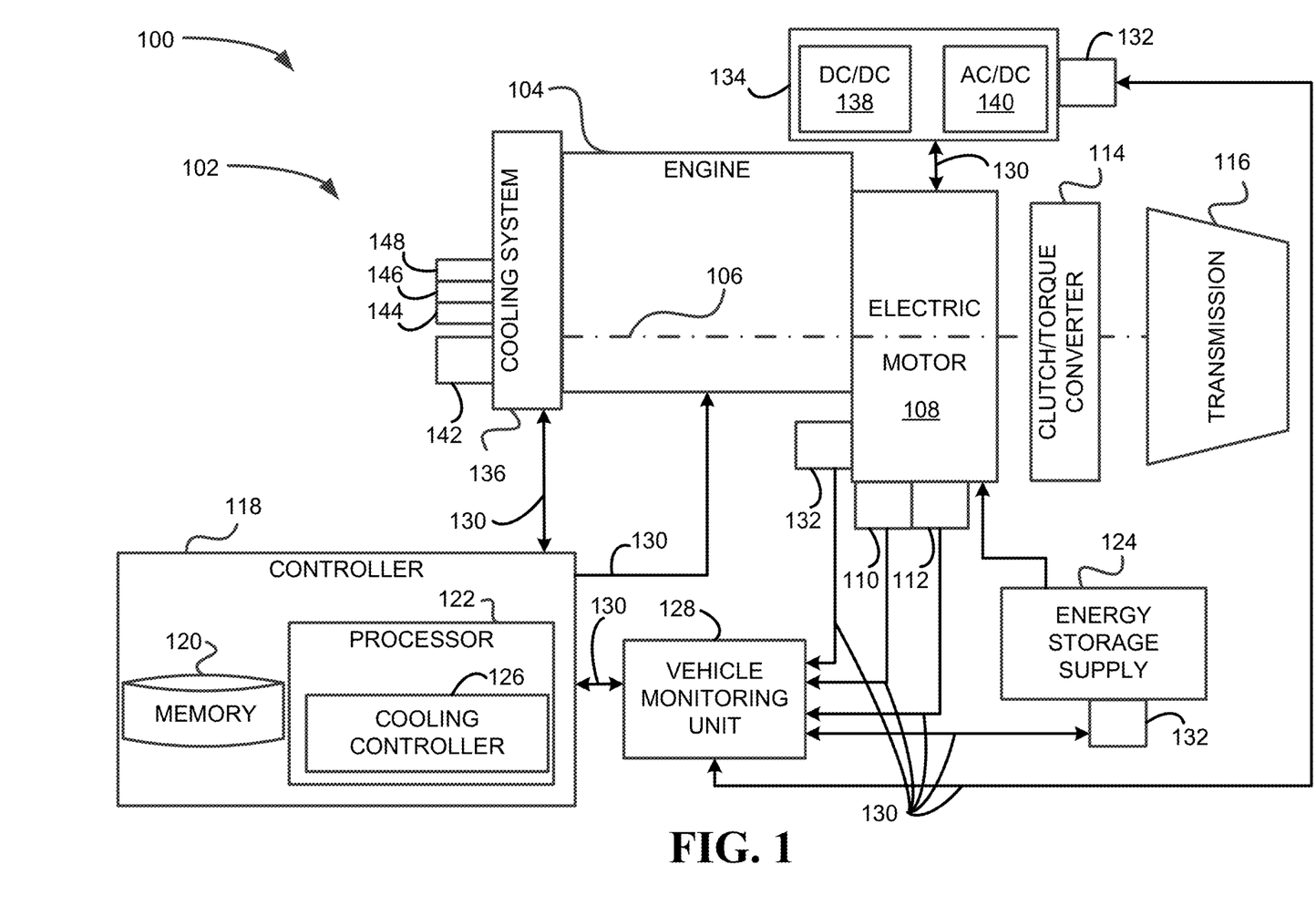
FIG. 1 is a schematic diagram of an engine and electric motor system featuring a cooling controller for electric vehicles in accordance with embodiments of the present disclosure.

Referring now to FIG. 1, a hybrid system 100 for an electric vehicle 102 is illustrated. Electric vehicle 102 can be plugged into an electrical outlet to be connected to a power grid system (not shown) for performing an electrification operation of electric vehicle 102. In other embodiments, a wireless charger or a pantograph charger can be used in addition to the electrical outlet. In various embodiments, the electrification operation may refer to various operations related to electricity generation and electric power distribution and management associated with electric vehicle 102. Exemplary electrification operations include modification of the battery cooling, modification of the charge and/or discharge limits, reducing the number of charging and/or discharging cycles, modification of the minimum state-of-charge threshold, and the like. Electric vehicle 102 may be a commercial vehicle, such as a transit bus, that is connectable to the power grid system.

In one embodiment, the power grid system can be a grid system implemented in a specific commercial facility, such as a bus depot. In another embodiment, the power grid system can be a grid system implemented in a grid network incorporating a plurality of power stations, such as power plants and other power-generating facilities. In FIG. 1, although electric vehicle 102 is depicted as a parallel hybrid system, the present disclosure can also be applied to a range-extended vehicle or a series hybrid vehicle to suit different applications. As such, electric vehicle 102 may be any electric vehicle having an electric propulsion system (e.g., hybrid, pure electric, and/or range-extended vehicles).

Although electric vehicle 102 with an internal combustion engine (ICE) 104 is shown, the present disclosure can be applied to a pure electric vehicle powered by only batteries without ICE 104. ICE 104 can be powered by any type of fuel, such as gasoline, diesel, natural gas, liquefied petroleum gases, biofuels, and the like. In this embodiment, hybrid system 100 can include ICE 104 having a crankshaft 106 and a crankshaft sprocket (not shown) coupled to the crankshaft. ICE 104 is not particularly limited and can be on-board (e.g., a range-extended vehicle) or off-board (e.g., a genset located at the bus depot).

Hybrid system 100 can also include an electric motor 108 in mechanical communication with the crankshaft sprocket. For example, electric motor 108 can be a traction motor used for propulsion of electric vehicle 102. In various embodiments, electric motor 108 can be coupled to a speed sensor 110, a torque sensor 112, ICE 104, a clutch or torque converter 114, and a transmission 116 via crankshaft 106. In various embodiments, speed sensor 110 and electric motor 108 are in mechanical communication with crankshaft 106. Also, electric motor 108 is not particularly limited and, for example, can be a motor/generator, synchronous motor, or an induction motor.

In embodiments, hybrid system 100 also includes a controller 118 in electrical communication with speed sensor 110 and torque sensor 112. Controller 118 can include a non-transitory memory 120 having instructions that, in response to execution by a processor 122, cause processor 122 to determine a speed or torque value of electric motor 108. Electric motor 108 receives electric power from a rechargeable energy storage supply 124, such as a battery pack or assembly, and energy storage supply 124 can provide data representative of state-of-charge (SOC) information to controller 118. Processor 122, non-transitory memory 120, and controller 118 are not particularly limited and can, for example, be physically separate. Additionally, a vehicle monitoring unit 128 can be included in controller 118 or can be an independent unit separate from controller 118 to suit different applications.

In certain embodiments, controller 118 can form a portion of a processing subsystem including one or more computing devices having memory, processing, and communication hardware. Controller 118 can be a single device or a distributed device, and functions of controller 118 can be performed by hardware and/or as computer instructions on a non-transient computer readable storage medium, such as non-transitory memory 120.

In certain embodiments, controller 118 includes one or more interpreters, determiners, evaluators, regulators, and/or processors 122 that functionally execute the operations of controller 118. The description herein including interpreters, determiners, evaluators, regulators, and/or processor emphasizes the structural independence of certain aspects of controller 118 and illustrates one grouping of operations and responsibilities of controller 118. Other groupings that execute similar overall operations are understood within the scope of the present disclosure. Interpreters, determiners, evaluators, regulators, and processors can be implemented in hardware and/or as computer instructions on a non-transient computer readable storage medium, and can be distributed across various hardware or computer-based components.

Example and non-limiting implementation elements that functionally execute the operations of controller 118 include sensors, such as speed sensor 110 and torque sensor 112, providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In the illustrated embodiment, processor 122 includes a cooling controller 126 configured to control cooling operation of electric vehicle 102. In this embodiment, cooling controller 126 is included in controller 118 of electric vehicle 102. It is advantageous that cooling controller 126 is configured to predict when a peak power of electric vehicle 102 will be required by using information from vehicle monitoring unit 128. For example, cooling controller 126 is configured to automatically communicate with vehicle monitoring unit 128 to determine look-ahead demand information of electric vehicle 102. The look-ahead demand information may be one or more vehicle characteristics representative of a future power demand needed by electric vehicle 102. Cooling controller 126 proactively and automatically performs the cooling operation based on the look-ahead demand information as described herein.

In one embodiment, cooling controller 126 can over-cool electric motor 108 in anticipation of upcoming hills. For example, electric motor 108 typically can run at a nominal temperature of approximately 45-65 degree Celsius (° C.). However, if electric motor 108 is over-cooled by cooling controller 126 to approximately 25-30 degree Celsius (° C.) prior to encountering road conditions, such as large grade hills, then cooling controller 126 can extend or lengthen the time it takes to reach a derate temperature for electric vehicle 102. Since it takes longer to reach the derate temperature, electric motor 108 can be operated longer without reaching a power derating point when a power of electric motor 108 is derated.

In one embodiment, vehicle monitoring unit 128 can be a telematics system associated with electric vehicle 102. In embodiments, vehicle monitoring unit 128 is configured to monitor one or more vehicle characteristics related to electric vehicle 102. For example, such vehicle characteristics can include the look-ahead demand information of one or more components of electric vehicle 102, such as ICE 104 or electric motor 108, navigational information based on a navigation system (e.g., a global positioning system (GPS)), thermal information (e.g., a temperature) of one or more components of electric vehicle 102, such as a current temperature of electric motor 108, environment information related to a specific route for the mission of electric vehicle 102 (e.g., time of day, weather, road or load conditions, etc.). Other exemplary vehicle components of electric vehicle 102 can include a charging system 134, a cooling system 136, a separate generator (not shown), a drivetrain or powertrain (e.g., a crankshaft), a drive axle assembly (not shown), and the like.

In one embodiment, cooling controller 126 interfaces with a network 130, such as a wireless communication facility (e.g., a Wi-Fi access point). In another embodiment, network 130 can be a controller area network (e.g., CAN bus) on-board electric vehicle 102. In yet another embodiment, network 130 can be a cloud computing network off-board electric vehicle 102. Other similar networks known in the art are also contemplated. For example, network 130 can be a cloud network or a vehicle-to-grid (V2G) network between electric vehicle 102 and the power grid system, or a vehicle-to-vehicle (V2V) network 136 between electric vehicles 102. In embodiments, any type of computer network having a collection of computers, servers, and other hardware interconnected by communication channels is contemplated, such as the Internet, Intranet, Ethernet, LAN, cloud network, etc.

In one embodiment, cooling controller 126 communicates with vehicle monitoring unit 128 to obtain thermal information of electric motor 108 provided to vehicle monitoring unit 128 by a temperature sensor 132. Additional temperature sensors 132 can be included in electric vehicle 102 for other components of electric vehicle 102 to suit different applications. In various embodiments, one or more temperature sensors 132 can be associated with energy storage supply 124, charging system 134, cooling system 136, and the like.

In one example, cooling controller 126 communicates with vehicle monitoring unit 128 to obtain thermal information of charging system 134 provided to vehicle monitoring unit 128 by temperature sensor 132. In another example, cooling controller 126 communicates with vehicle monitoring unit 128 to obtain thermal information of energy storage supply 124 provided to vehicle monitoring unit 128 by temperature sensor 132. In the illustrated embodiment, charging system 134 is configured to charge and/or discharge electric vehicle 102 and to provide electric power to one or more other electric vehicles or electric devices. In various embodiments, charging system 134 can include one or more DC-to-DC inverter 138 and/or one or more AC-to-DC inverter 140 to suit the application. Further, cooling system 136 is configured to selectively provide a cooling fluid to various components of electric vehicle 102 using a cooling pump 142. An exemplary cooling system 136 can be a radiator. In the depicted example, cooling system 136 also includes a compressor 144, a fan 146 and a cooling valve 148.

In another embodiment, cooling controller 126 communicates with vehicle monitoring unit 128 to obtain navigational information of electric vehicle 102. For example, vehicle monitoring unit 128 communicates with the GPS having mapping information with geographical data which may be previously stored in memory 120, and associates the mapping information with the navigational information. In various embodiments, vehicle monitoring unit 128 provides the navigational information that includes a current or future position and a current or future speed of electric vehicle 102 in relation to the geographical data. The current or future speed of electric vehicle 102 can refer to a vehicle speed (e.g., miles per hour) or an engine speed (e.g., a revolutions per minute (RPM)).

In other embodiments, cooling controller 126 communicates with vehicle monitoring unit 128, which communicates with the GPS to determine the environment information related to the specific route for the mission of electric vehicle 102. In one embodiment, the environment information includes one or more indications of upcoming hills (e.g., uphill or downhill). For example, vehicle monitoring unit 128 communicates with the GPS having the mapping information with geographical data which may be previously stored in memory 120, and associates the mapping information with the environment information. In various embodiments, vehicle monitoring unit 128 provides the environment information that includes a road configuration (e.g., a predicted grade, slope length, or slope degree of a road), a current time (e.g., operating at 2:00 am versus 5:00 pm), a traffic condition (e.g., congested or no traffic), a road condition (e.g. rough v. paved), a load condition (e.g., partially loaded v. fully loaded, or load weight), and the like, in relation to the geographical data.

In yet another embodiment, cooling controller 126 communicates with vehicle monitoring unit 128 to determine the look-ahead demand information of electric vehicle 102 provided to vehicle monitoring unit 128 by speed sensor 110 and/or torque sensor 112. As discussed above, the look-ahead demand information refers to one or more vehicle characteristics representative of a future power demand needed by electric vehicle 102. For example, cooling controller 126 calculates the future power demand based on a current power demand of electric vehicle 102 and at least one of: the navigational information, the thermal information, and the environment information. The current power demand refers to a power demand needed at a current time to maintain a current vehicle speed. For example, vehicle monitoring unit 128 monitors the current vehicle speed using speed sensor 110 and the amount of power using torque sensor 112, and cooling controller 126 calculates the future power demand including a predicted speed demand and/or a predicted torque demand.

Cooling controller 126 is configured to generate a cooling command to control the cooling operation of one or more components of electric vehicle 102 based on the look-ahead demand information. For example, the cooling command is generated based on the thermal information and the future power demand for electric vehicle 102 calculated based on the navigational information (e.g., an upcoming hill). If a flat road is predicted ahead and only continuous electric power demand is needed, cooling controller 126 generates the cooling command to operate cooling system 136 to cool in a normal mode for energy efficiency. However, if a large, uphill grade is predicted ahead, cooling controller 126 generates the cooling command to operate cooling system 136 to over-cool one or more components of electric vehicle 102 to a temperature (e.g., 25-30° C.) that is lower than the nominal temperature (e.g., 45-65° C.) to anticipate a power peak during travel through the upcoming hill.

Figure 2:
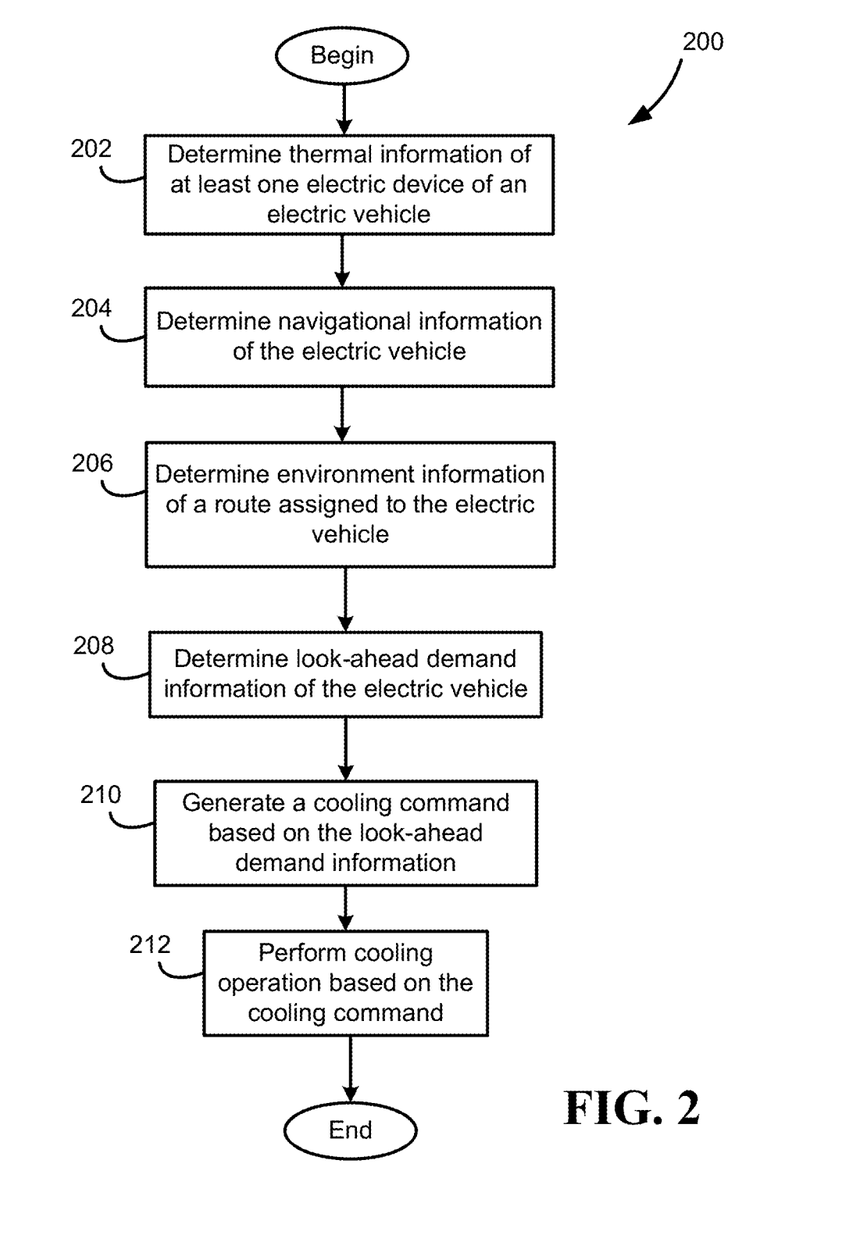
FIG. 2 is a flow chart of an exemplary cooling control method using the cooling controller of FIG. 1 in accordance with embodiments of the present disclosure.

Referring now to FIG. 2, an illustrative cooling operation is shown for electric vehicle 102 in accordance with embodiments of the subject matter disclosed herein. As disclosed herein, hybrid system 100 is not particularly limited and can perform any of the methods described within the scope of this disclosure. In FIG. 2, a method 200 of performing the automated cooling operation is shown using cooling controller 126. At block 202, cooling controller 126 automatically communicates with vehicle monitoring unit 128 to determine the thermal information of at least one electric device of electric vehicle 102, such as electric motor 108, provided to vehicle monitoring unit 128 by temperature sensor 132. For example, cooling controller 126 communicates with vehicle monitoring unit 128 to detect a temperature of electric motor 108. In another example, cooling controller 126 communicates with vehicle monitoring unit 128 to detect a temperature of cooling system 136.

At block 204, cooling controller 126 communicates with vehicle monitoring unit 128 to determine the navigational information of electric vehicle 102 provided to vehicle monitoring unit 128 by the GPS. For example, vehicle monitoring unit 128 provides the navigational information that includes a current position and a current speed of electric vehicle 102 in relation to the geographical data associated with the GPS.

At block 206, cooling controller 126 communicates with vehicle monitoring unit 128 to determine the environment information related to the specific route for the mission of electric vehicle 102. For example, vehicle monitoring unit 128 communicates with the GPS having the mapping information with geographical data which may be previously stored in memory 120, and associates the mapping information with the environment information. As such, cooling controller 126 predicts whether a power-demanding road condition, such as an upcoming hill, is present on the specific route assigned to electric vehicle 102 using the mapping information associated with the specific route.

At block 208, cooling controller 126 determines look-ahead demand information of electric vehicle 102. The look-ahead demand information includes one or more vehicle characteristics representative of a future power demand needed by electric vehicle 102. For example, cooling controller 126 calculates the future power demand based on a current power demand of electric vehicle 102 and at least one of: the navigational information, the thermal information, and the environment information. In one embodiment, the current power demand can be inputted from an operator using an interface device, such as an interactive screen or a keyboard. In another embodiment, the current power demand can be transmitted from a control system of electric vehicle 102, such as an engine control unit (e.g., controller 118 and/or vehicle monitoring unit 128).

At block 210, cooling controller 126 generates a cooling command to control the cooling operation of one or more components of electric vehicle 102 based on the look-ahead demand information. For example, in a water/glycol cooling circuit configuration, the cooling command includes data representative of a target cooling temperature of the at least one electric device of electric vehicle 102 that can be used with cooling pump 142. In another example, in a refrigerant cooled circuit configuration, the cooling command includes the target cooling temperature to be used with compressor 144. In yet another example, in an electric fan configuration, the cooling command includes the target cooling temperature to be used with fan 146. In still another example, in a cooling valve configuration, the cooling command includes the target cooling temperature to be used with cooling valve 148.

At block 212, cooling controller 126 performs cooling operation on one or more components of electric vehicle 102 based on the cooling command. For example, using the cooling command, cooling controller 126 instructs cooling pump 142 to actuate to over-cool the at least one electric device, such as electric motor 108, to reach the target cooling temperature of electric motor 108. In another example, using the cooling command, cooling controller 126 instructs compressor 144 to actuate to over-cool the at least one electric device to reach the target cooling temperature. In yet another example, using the cooling command, cooling controller 126 instructs fan 146 to actuate to over-cool the at least one electric device to reach the target cooling temperature. In still another example, using the cooling command, cooling controller 126 instructs cooling valve 148 to actuate to over-cool the at least one electric device to reach the target cooling temperature. In other embodiments, cooling controller 126 instructs two or more of cooling pump 142, compressor 144, fan 146 and cooling valve 148 to operate together to cool the at least one electric device to reach the target cooling temperature.

As such, cooling controller 126 automatically predicts when the peak power will be required and proactively over-cools the at least one electric device (e.g., electric motor 108) associated with electric vehicle 102. For example, if electric vehicle 102 is traveling on a flat road, then a current vehicle power demand may be 100 kilowatt (kW) to maintain a current speed of 55 miles-per-hour (mph). When cooling controller 126 determines that there is an upcoming hill that will require 200 kW to maintain the current speed (55 mph), cooling controller 126 generates the cooling command to over-cool electric motor 108 so that the peak power can be used in the future when electric vehicle 102 reaches the hill. If cooling controller 126 determines that there is no significant upcoming change in the road grade, then cooling controller 126 does not over-cool electric motor 108 and maintains a nominal temperature for electric motor 108.

For another example, the target cooling temperature can be set approximately 50-60% lower than the nominal temperature of at least one electric device of electric vehicle 102, such as electric motor 108. When a refrigerant-based system is used in electric vehicle 102, the target cooling temperature can be set even lower, e.g., approximately 85% lower than the nominal temperature.

Figure 3:
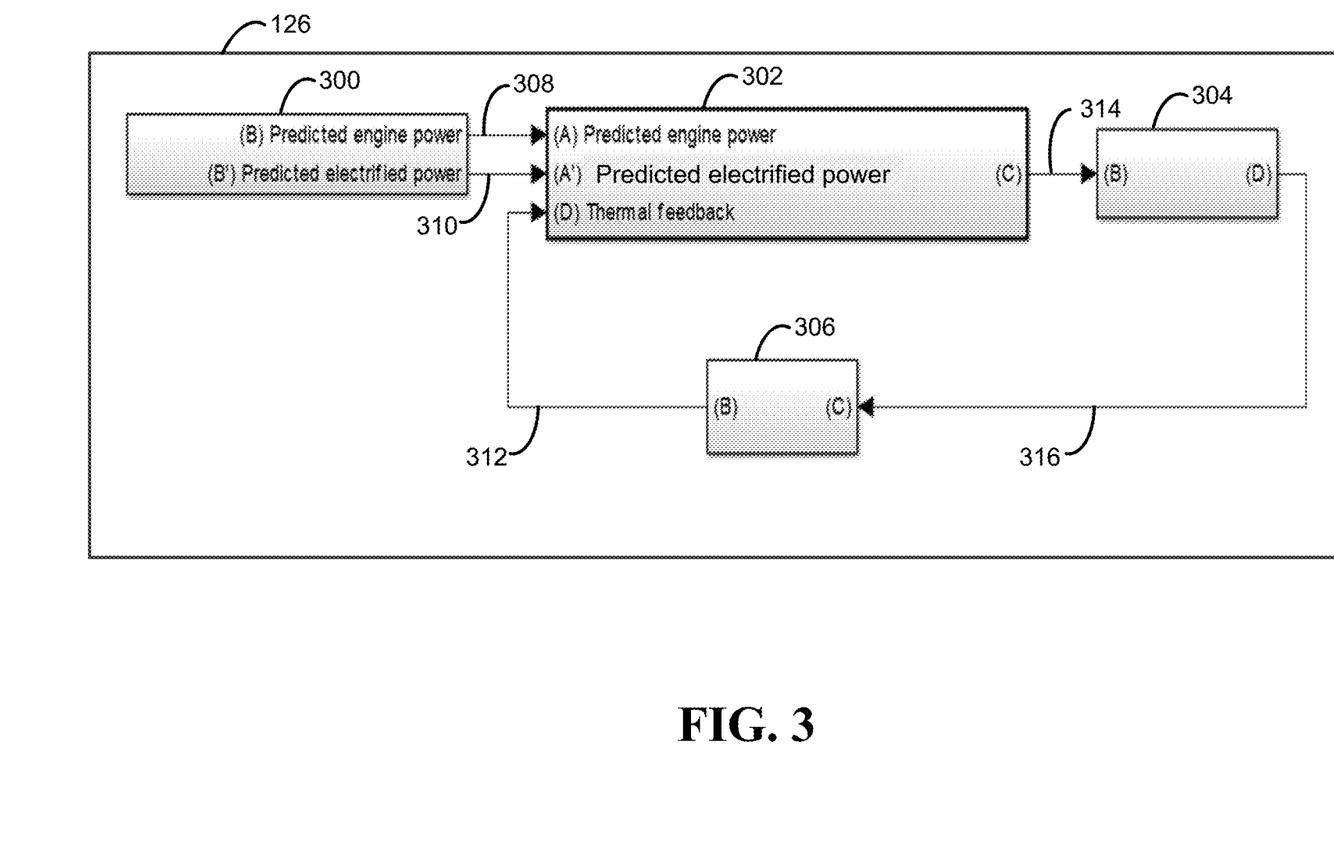
FIG. 3 is a schematic diagram of the cooling controller of FIG. 1 in accordance with embodiments of the present disclosure.

Referring now to FIG. 3, an exemplary schematic diagram of cooling controller 126 is shown. In FIG. 3, although exemplary subunits 300-306 of cooling controller 126 are shown, one or more subunits 300-306 can be independent units separate from cooling controller 126 or can be integrated as a single unit to suit different applications. Subunits 300-306 provide a reduced response delay during the cooling operation and achieve an enhanced system transient energy distribution balance. Consequently, cooling controller 126 can contribute to energy savings and high efficiency duty cycles, and further provide improved fuel economy for electric vehicle 102.

A predicted power unit 300 is configured to generate predicted thermal information including at least one of: a predicted engine power signal 308 of electric vehicle 102 and a predicted electrified power signal 310 of electric vehicle 102. In one embodiment, the predicted engine power signal 308 is generated based on the look-ahead demand information and includes information about a future engine power demand needed by electric vehicle 102. For example, the future engine power demand can be determined based on how much torque power is needed for ICE 104 or electric motor 108 in a future predetermined period (e.g., for the next 10-20 seconds) using at least one of: the navigational information, the thermal information, and the environment information. For example, predicted power unit 300 utilizes the mapping information associated with the GPS, and predicts a geographical condition of a current road for the next 10-30 seconds (e.g., the slope degree and length of a future uphill and/or downhill incline).

In another embodiment, the predicted electrified power signal 310 is generated based on the look-ahead demand information and includes information about a future electrified power demand needed by electric vehicle 102. For example, the future electrified power demand can be determined based on how much electric power is needed from energy storage supply 124 (e.g., battery packs or assembly) in a future predetermined period (e.g., for the next 10-20 seconds) using at least one of: the navigational information, the thermal information, and the environment information.

An electrification thermal management (ETM) unit 302 is configured to receive predicted thermal information including at least one of: the predicted engine power signal 308 and the predicted electrified power signal 310 from predicted power unit 300. Also, ETM unit 302 is configured to receive a thermal feedback signal 312 from an electrification component monitoring unit 306. The thermal feedback signal 312 includes data representative of the thermal information of one or more components of electric vehicle 102. For example, the thermal feedback signal 312 can include data representative of whether a current temperature of electric motor 108 is equal to the target cooling temperature. ETM unit 302 is configured to generate a control signal 314 based on the predicted thermal information provided by signal 308 and/or 310 and the thermal feedback signal 312. The control signal 314 is used to control the cooling operation of one or more components of electric vehicle 102.

An ETM control unit 304 is configured to receive the control signal 314 from ETM unit 302 and perform the cooling operation of one or more components of electric vehicle 102 based on the control signal 314. Further, ETM control unit 304 is configured to generate a status request signal 316 that instructs electrification component monitoring unit 306 to perform a monitoring operation of the one or more components of electric vehicle 102. For example, the status request signal 316 is transmitted from ETM control unit 304 to electrification component monitoring unit 306 to collect status information relating to the one or more components of electric vehicle 102 for assessing an efficiency of the cooling operation.

Electrification component monitoring unit 306 is configured to receive the status request signal 316 from ETM control unit 304. In response to receiving the status request signal 316, electrification component monitoring unit 306 is configured to collect status information relating to the one or more components of electric vehicle 102 for assessing the efficiency of the cooling operation, and also generate thermal feedback signal 312 based on the status information. Electrification component monitoring unit 306 transmits thermal feedback signal 312 to ETM unit 302 for subsequent processing. Detailed descriptions of subunits 300-306 are provided below in paragraphs relating to FIGS. 4-8.

As such, cooling controller 126 automatically predicts future demand and road conditions and performs the cooling operation for electric vehicle 102 in advance. Cooling controller 126 can maintain the one or more components of electric vehicle 102 in a steady temperature condition and control the cooling operation to prepare for the future power demand needed by electric vehicle 102. For example, the cooling operation can be performed to enhance the coolant pump power, mass flow rate distribution, and other thermal management strategies.

Figure 4:
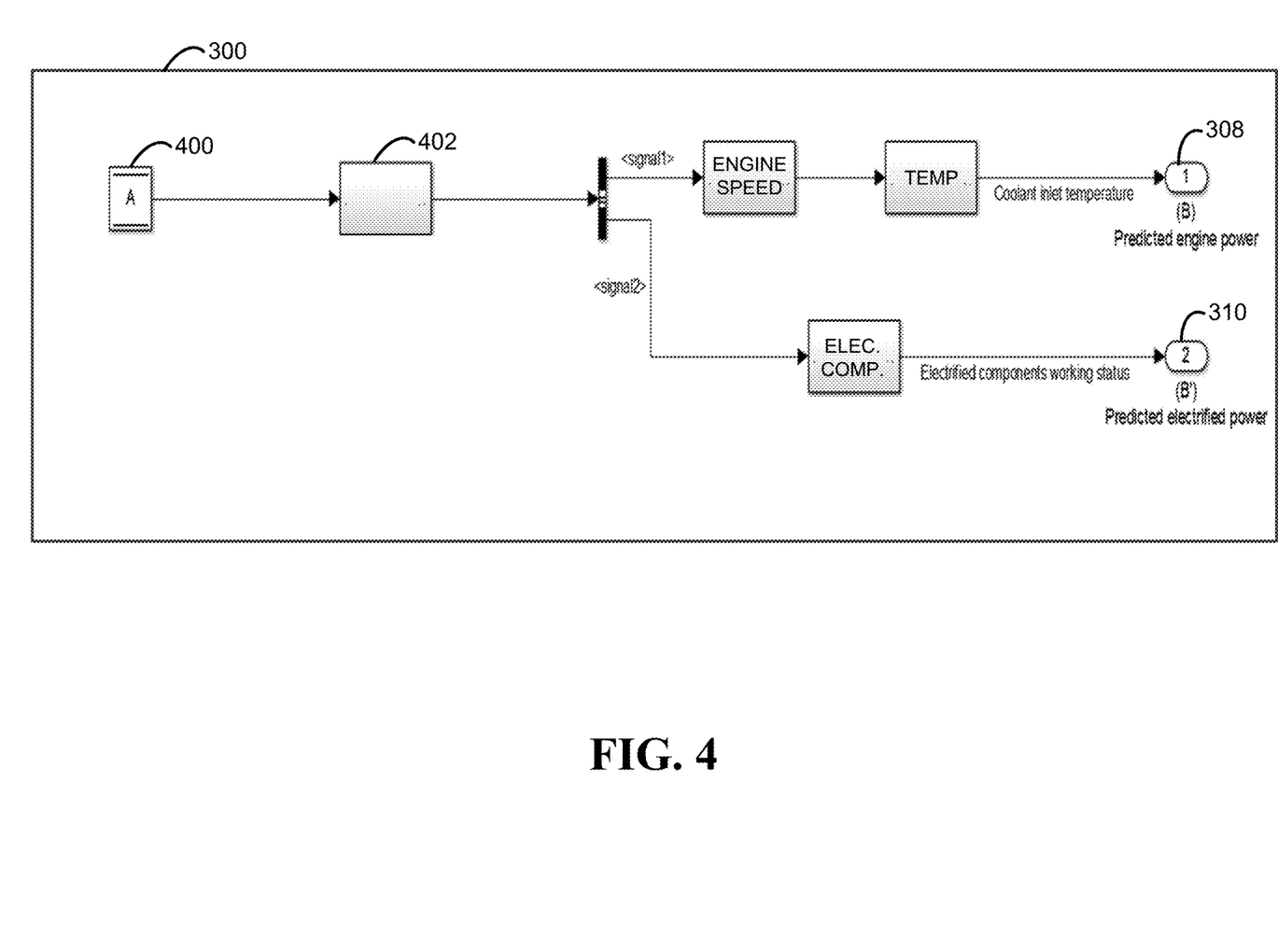
FIG. 4 is a schematic diagram of a predicted power unit of the cooling controller of FIG. 3 in accordance with embodiments of the present disclosure.

Referring now to FIG. 4, an exemplary schematic diagram of predicted power unit 300 is shown. In the illustrated embodiment, the predicted thermal information is generated based on the look-ahead demand information. As discussed above, the look-ahead demand information includes one or more vehicle characteristics representative of the future power demand needed by electric vehicle 102. The future power demand can be calculated based on at least one of: the navigational information, the thermal information, and the environment information.

A route information unit 400 is configured to determine look-ahead route information based on at least one of: the environment information and the navigational information. For example, the environment information includes mapping information representative of the road configuration and the road condition. As another example, the navigational information can include information about current and/or future locations of electric vehicle 102 using the mapping information, such as latitude, longitude, altitude, and the like. Also, the navigational information can include information about current and/or future speeds of electric vehicle 102.

A route calculator unit 402 is configured to determine a road configuration, such as a predicted grade, a slope length, and/or a slope degree of a current road associated with electric vehicle 102 based on the environment information.

Further, route calculator unit 402 is configured to predict a road condition (e.g., uphill v. downhill) based on the environment information.

Route calculator unit 402 is configured to generate the predicted engine power signal 308 based on the look-ahead demand information. The predicted engine power signal 308 includes information about the future engine power demand needed by electric vehicle 102 using at least one of: the navigational information, the thermal information, and the environment information. In this embodiment, the predicted engine power signal 308 is generated based on the navigational information (e.g., an engine speed) and the thermal information (e.g., a temperature of a radiator) using the environment information.

Further, route calculator unit 402 is configured to generate the predicted electrified power signal 310 based on the look-ahead demand information. The predicted electrified power signal 310 includes information about the future electrified power demand needed by electric vehicle using at least one of: the navigational information, the thermal information, and the environment information. In this embodiment, the predicted electrified power signal 310 is generated based on how much electric power is needed for one or more electrification components (e.g., electric motor 108 or energy storage supply 124) using the environment information.

Figure 5:
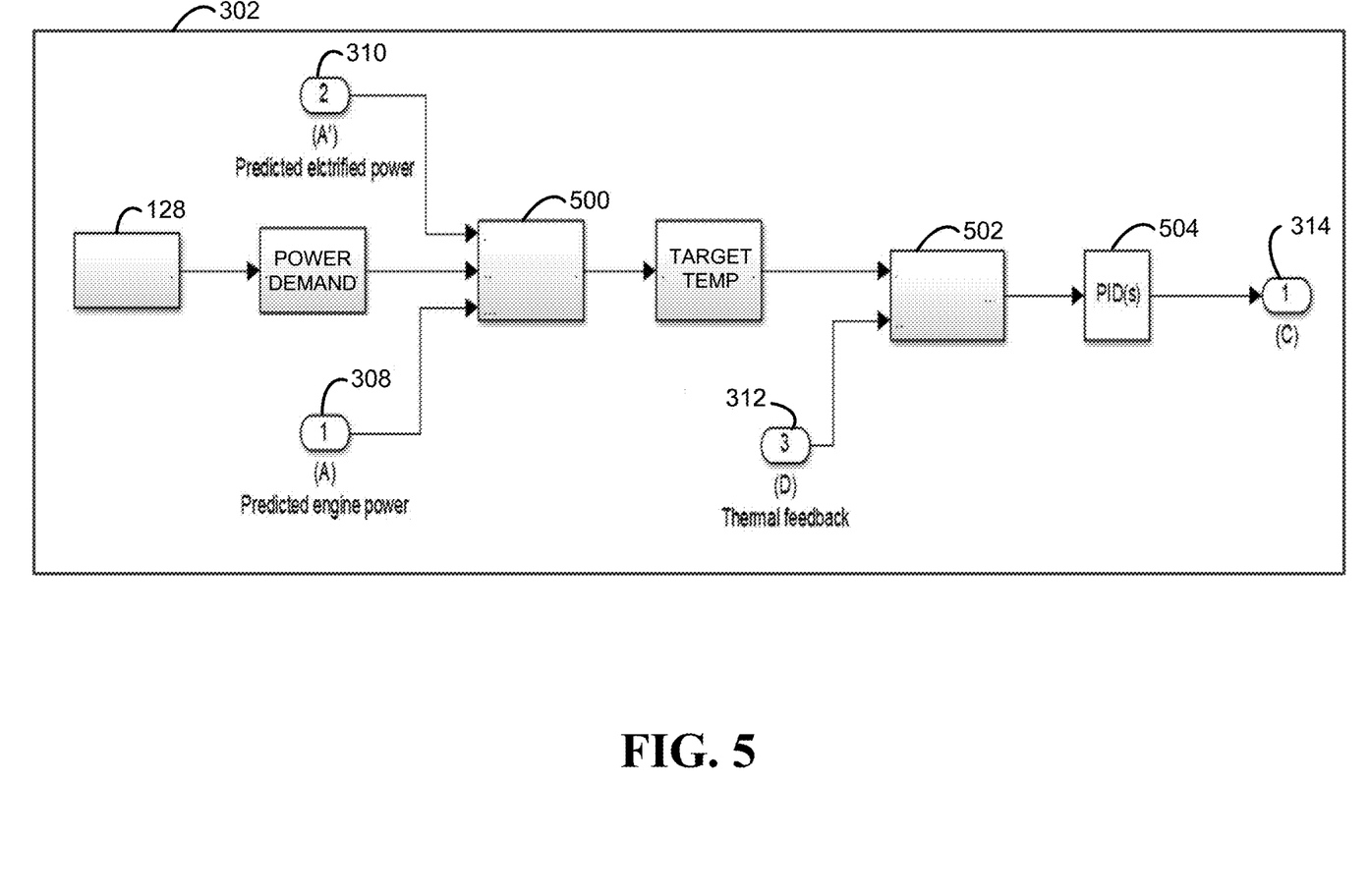
FIG. 5 is a schematic diagram of an electrification thermal management unit of the cooling controller of FIG. 3 in accordance with embodiments of the present disclosure.

Referring now to FIG. 5, an exemplary schematic diagram of ETM unit 302 is shown. In the illustrated embodiment, ETM unit 302 receives at least one of: the predicted engine power signal 308 and the predicted electrified power signal 310 from predicted power unit 300. ETM unit 302 is configured to receive the current power demand of electric vehicle 102 from vehicle monitoring unit 128, compare the current power demand with at least one of: the predicted engine power signal 308, the predicted electrified power signal 310, and the thermal feedback signal 312, and generate the control signal 314 based on the comparison. For example, when ETM unit 302 determines that the temperature of electric motor 108 will rise 5° C. in the next 10 minutes due to an increased engine power demand for an upcoming hill, ETM unit 302 generates the control signal 314 having one or more instructions to set the target cooling temperature to lower the temperature of electric motor 108 by a predetermined amount (e.g., 5° C.) for a predetermined period (e.g., 2 minutes). In this embodiment, a power revise unit 500 is configured to receive the predicted engine power signal 308 and the predicted electrified power signal 310, and revise the control signal 314 based on the predicted engine power signal 308 and the predicted electrified power signal 310.

A temperature revise unit 502 is configured to receive the thermal feedback signal 312 from electrification component monitoring unit 306 and revise the control signal 314 based on the target cooling temperature and the thermal feedback signal 312. A proportional-integral-derivative (PID) controller 504 can be included in ETM unit 302 to regulate control signal 314 based on the target cooling temperature and the thermal feedback signal 312. For example, PID controller 504 can be used to receive the target cooling temperature as an input and compare the target cooling temperature with an actual or current temperature (e.g., a measured value by temperature sensor 132) or a predetermined setpoint. PID controller 504 can then generate or revise/correct the control signal 314 based on the comparison (e.g., using an error value based on the comparison).

Figure 6:
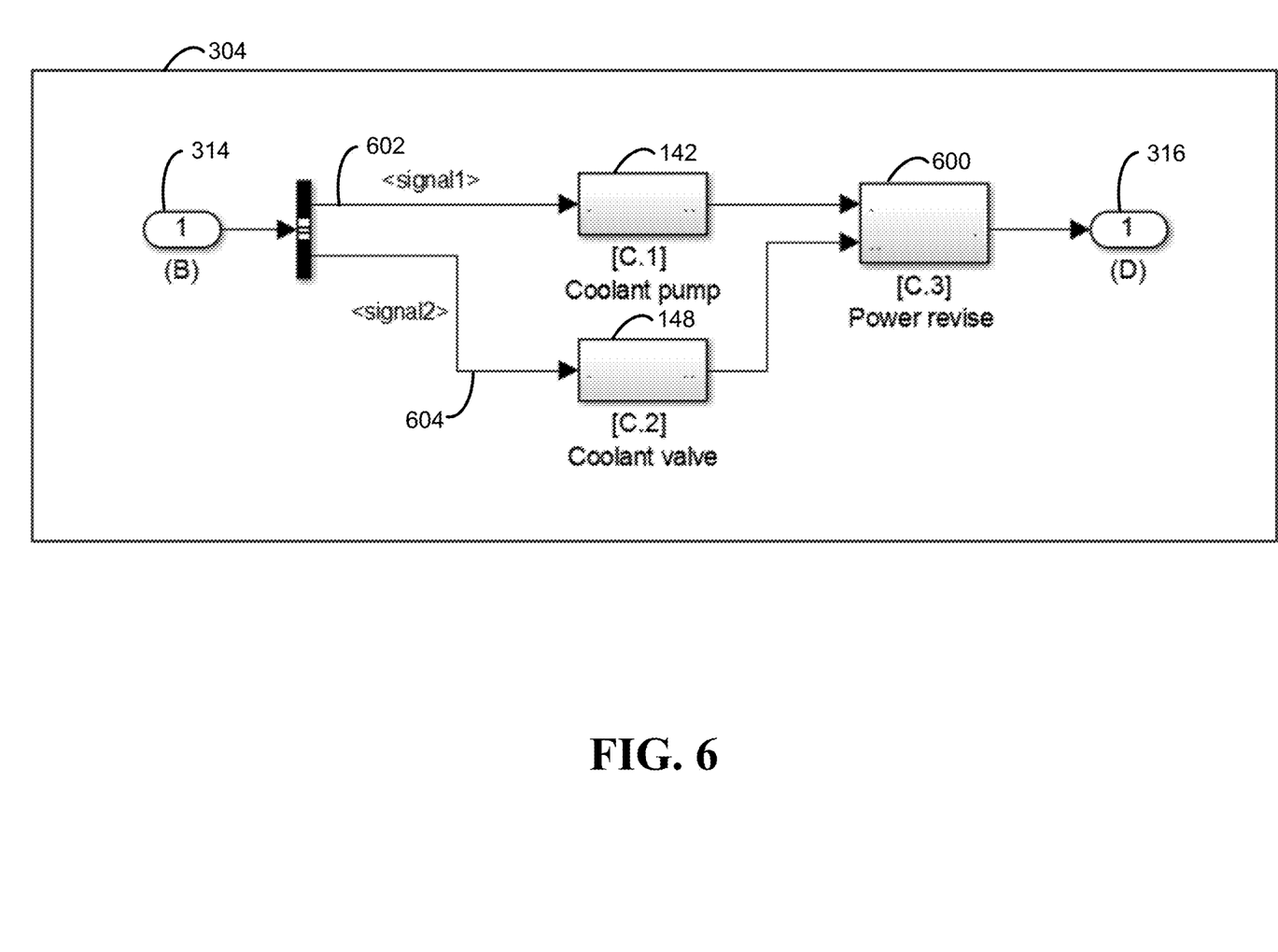
FIG. 6 is a schematic diagram of an electrification thermal management control unit of the cooling controller of FIG. 3 in accordance with embodiments of the present disclosure.

Referring now to FIG. 6, an exemplary schematic diagram of ETM control unit 304 is shown. In the illustrated embodiment, ETM control unit 304 receives the control signal 314 from ETM unit 302 and performs the cooling operation of one or more components of electric vehicle 102 based on the control signal 314. In one embodiment, the control signal 314 can include a first control signal 602 configured to control the cooling operation of cooling pump 142 and a second control signal 604 configured to control the cooling operation of cooling valve 148. For example, the first control signal 602 can be used to operate cooling pump 142 at a desired flow rate. As another example, the second control signal 604 can be used to actuate cooling valve 148 to a desired position. Other suitable components of cooling system 136, such as actuators, are also contemplated for controlling the cooling operation using the control signal 314.

In one embodiment, another power revise unit 600 can be added in ETM control unit 304 and configured to revise the control signal 314 based on an actual or measured flow rate of cooling fluid (e.g., coolant) used in cooling pump 142 or cooling valve 148. Further, power revise unit 600 is configured to generate the status request signal 316 that instructs electrification component monitoring unit 306 to perform a monitoring operation of the one or more components of electric vehicle 102.

Figure 7:
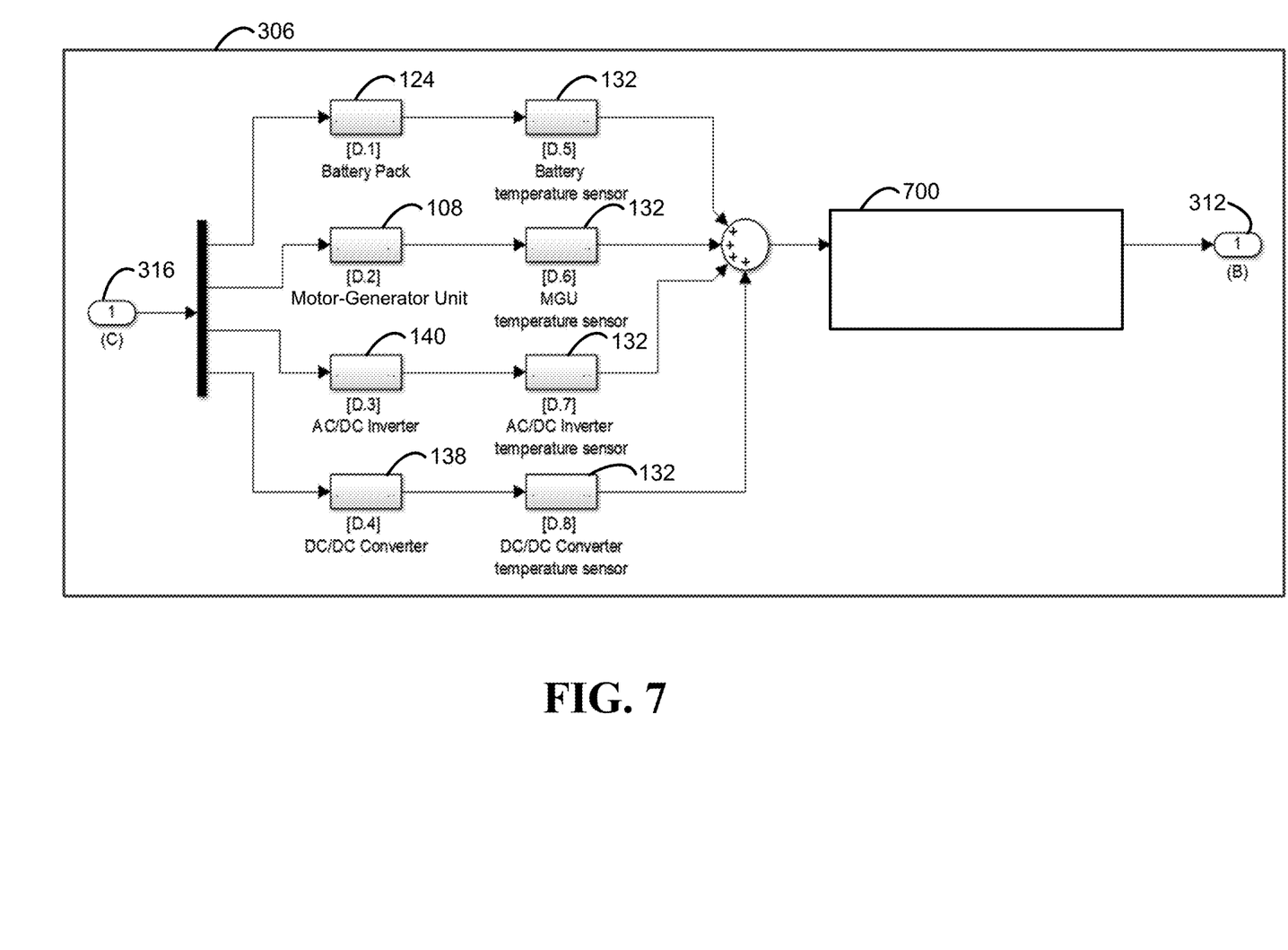
FIG. 7 is a schematic diagram of an electrification component monitoring unit of the cooling controller of FIG. 3 in accordance with embodiments of the present disclosure.

Referring now to FIG. 7, an exemplary schematic diagram of electrification component monitoring unit 306 is shown. In the illustrated embodiment, electrification component monitoring unit 306 receives the status request signal 316 and in response to receiving the status request signal 316, collects status information relating to the one or more components of electric vehicle 102 for assessing the efficiency of the cooling operation performed using the control signal 314.

For example, the status request signal 316 can be used to instruct cooling controller 126 to collect the status information relating to energy storage supply 124 (e.g., battery packs) using temperature sensor 132 (e.g., a battery temperature sensor). In another example, the status request signal 316 can be used to instruct cooling controller 126 to collect the status information relating to electric motor 108 (e.g., a motor generator) using temperature sensor 132 (e.g., a generator temperature sensor). In yet another example, the status request signal 316 can be used to instruct cooling controller 126 to collect the status information relating to AC-to-DC inverter 140 using temperature sensor 132 (e.g., an AC-to-DC inverter temperature sensor). In still another example, the status request signal 316 can be used to instruct cooling controller 126 to collect the status information relating to DC-to-DC inverter 138 using temperature sensor 132 (e.g., a DC-to-DC inverter temperature sensor).

A temperature judgement unit 700 is configured to receive the status information having one or more temperature readings received from various temperature sensors 132 relating to one or more components of electric vehicle 102. Temperature judgement unit 700 is configured to calculate a difference between a current temperature of a corresponding component of electric vehicle 102 and a target cooling temperature for the corresponding component. The thermal feedback signal 312 is generated based on the difference between the current temperature and the target cooling temperature. For example, the thermal feedback signal 312 can include data representative of whether a current temperature of electric motor 108 reached the target cooling temperature.

As such, cooling controller 126 uses future route/road conditions and corresponding predicted power (e.g., torque or speed) demands to proactively perform the cooling operation in advance. Consequently, cooling controller 126 provides enhanced thermal management strategies on the electrification system of electric vehicle 102 and reduces or eliminates the response delay of control signals, power demand transitions and coolant physical transmissions. Thus, an improved and efficient cooling system control can be achieved by cooling controller 126.

Figure 8:
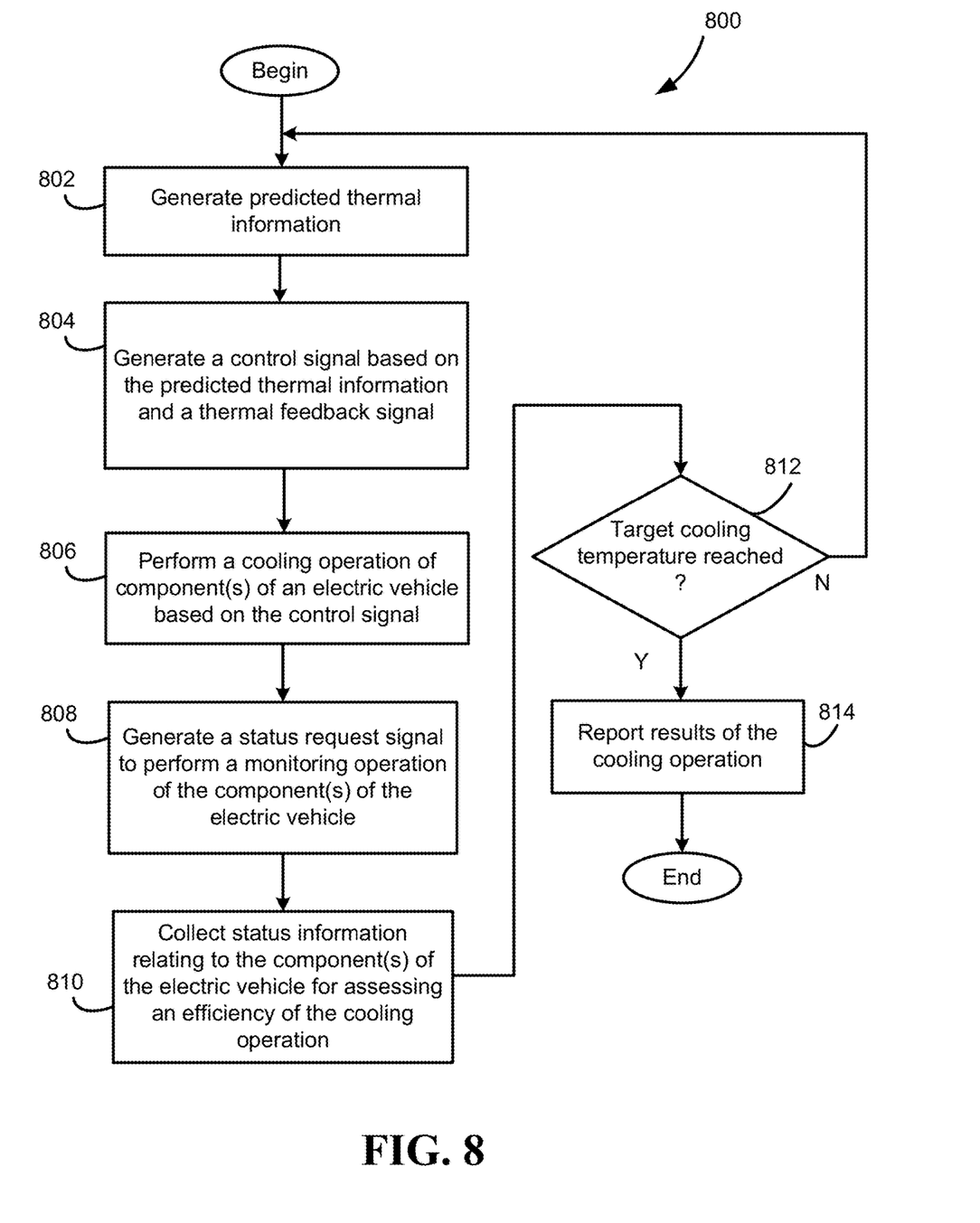
FIG. 8 is a flow chart of another exemplary cooling control method using the cooling controller of FIG. 3 in accordance with embodiments of the present disclosure.

Referring now to FIG. 8, another illustrative cooling operation is shown for electric vehicle 102 in accordance with embodiments of the subject matter disclosed herein. As disclosed herein, hybrid system 100 is not particularly limited and can perform any of the methods described within the scope of this disclosure. In FIG. 8, a method 800 of performing the automated cooling operation is shown using cooling controller 126.

At block 802, predicted power unit 300 generates predicted thermal information including at least one of: a predicted engine power signal 308 of electric vehicle 102 and a predicted electrified power signal 310 of electric vehicle 102. For example, predicted power unit 300 generates the predicted engine power signal 308 and the predicted electrified power signal 310 based on the look-ahead demand information.

At block 804, ETM unit 302 receives the predicted thermal information and generates a control signal 314 based on the predicted thermal information and a thermal feedback signal 312. The thermal feedback signal 312 includes data representative of the thermal information of one or more components of electric vehicle 102. For example, the thermal feedback signal 312 can include data representative of whether a current temperature of electric motor 108 reached the target cooling temperature.

At block 806, ETM control unit 304 receives the control signal 314 and performs the cooling operation of one or more components of electric vehicle 102 based on the control signal 314. For example, the control signal 314 can be used to operate cooling pump 142 at a desired flow rate or actuate cooling valve 148 at a desired position. Further, the control signal 314 can include a plurality of sub-control signals for facilitating multiple cooling operations for various components of electric vehicle 102, either simultaneously or sequentially. For example, a first sub-control signal controls the cooling operation of cooling pump 142 and a second sub-control signal controls the cooling operation of cooling valve 148.

At block 808, ETM control unit 304 generates the status request signal 316 that instructs electrification component monitoring unit 306 to perform a monitoring operation of the one or more components of electric vehicle 102 during the cooling operation. The status request signal 316 is transmitted from ETM control unit 304 to electrification component monitoring unit 306 to collect status information relating to the one or more components of electric vehicle 102 for assessing an efficiency of the cooling operation.

At block 810, electrification component monitoring unit 306 receives the status request signal 316 and collects status information relating to the one or more components of electric vehicle 102 for assessing the efficiency of the cooling operation. Electrification component monitoring unit 306 then generates the thermal feedback signal 312 based on the status information.

At block 812, temperature judgement unit 700 of electrification component monitoring unit 306 calculates a difference between a current temperature of a corresponding component of electric vehicle 102 and a target cooling temperature for the corresponding component. When the current temperature of the corresponding component of electric vehicle 102 reaches the target cooling temperature, control proceeds to block 814. Otherwise, control returns to block 802.

At block 814, cooling controller 126 reports results of the cooling operation to an operator or another control system associated with electric vehicle 102. For example, the results of the cooling operation, such as operation errors or comparisons of temperatures, can be displayed on a dash board of electric vehicle 102. In another example, the results of the cooling operation including operational parameters, such as temperature values, can be transmitted to controller 118 (e.g., an engine control unit). Other suitable arrangements are also contemplated to suit the application.

It should be understood that, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Various modifications and additions can be made to the exemplary embodiments discussed without departing from the scope of the presently disclosed subject matter. For example, while the embodiments described above refer to particular features, the scope of this disclosure also includes embodiments having different combinations of features and embodiments that do not include all of the described features. Accordingly, the scope of the subject matter disclosed herein is intended to embrace all such alternatives, modifications, and variations as fall within the scope of the claims, together with all equivalents thereof.

What is claimed is:

1. A system for performing a cooling operation for an electric vehicle using a processor comprising:
    a vehicle monitoring unit configured to monitor one or more vehicle characteristics related to the electric vehicle, the one or more vehicle characteristics including look-ahead demand information of at least an electric motor of the electric vehicle; and
    a cooling controller configured to:
        communicate with the vehicle monitoring unit,
        predict the lock-ahead demand information representative of a future power demand including a predicted torque demand based on a geographical condition of a current route of the electric vehicle, and
        generate a cooling command based on the look-ahead demand information and perform the cooling operation based on the cooling command by over-cooling at least the electric motor of the electric vehicle in view of an elevation change based geographical condition of the current route.

2. The system of claim 1, wherein the over-cooling is performed using the cooling command that includes data representative of a target cooling temperature of at least one electric device of the electric vehicle, the target cooling temperature being set lower than a nominal temperature of the at least one electric device.

3. The system of claim 1, wherein the cooling controller is configured to calculate the future power demand based on a current power demand of the electric vehicle and at least one of: navigational information, thermal information, and environment information.

4. The system of claim 3, wherein the cooling controller is configured to determine the thermal information associated with the electric vehicle based on a temperature of at least one electric device of the electric vehicle.

5. The system of claim 3, wherein the cooling controller is configured to determine the navigational information associated with the electric vehicle using information received from a positioning system.

6. The system of claim 3, wherein the cooling controller is configured to determine the environment information associated with the electric vehicle using mapping information.

7. A method of performing a cooling operation for an electric vehicle using a processor, comprising:
    monitoring one or more vehicle characteristics related to the electric vehicle, the one or more vehicle characteristics including look-ahead demand information of at least an electric motor of the electric vehicle;
    determining the look-ahead demand information representative of a future power demand including a predicted torque demand based on a geographical condition of a current route of the electric vehicle;
    generating a cooling command using the look-ahead demand information; and
    performing the cooling operation using the cooling command by over at least the electric motor of the electric vehicle in view of an elevation change based on the geographical condition of the current route.

8. The method of claim 7, further comprising:
    including, in the cooling command, data representative of a target cooling temperature of at least one electric device of the electric vehicle for performing the over-cooling; and
    setting the target cooling temperature lower than a nominal temperature of the at least one electric device.

9. The method of claim 7, further comprising calculating the future power demand based on a current power demand of the electric vehicle and at least one of: navigational information, thermal information, and environment information.

10. The method of claim 9, further comprising:
    determining the thermal information associated with the electric vehicle using a temperature of at least one electric device of the electric vehicle;
    determining the navigational information associated with the electric vehicle using information received from a positioning system; and
    determining the environment information associated with the electric vehicle using mapping information.

11. A system for performing a cooling operation for an electric vehicle using a processor, comprising:
    a predicted power unit configured to generate predicted thermal information using look-ahead demand information representative of a future power demand including a predicted torque demand based on a geographical condition of a current route of the electric vehicle;
    an electrification thermal management (ETM) unit configured to receive the predicted thermal information from the predicted power unit and generate a control signal using the predicted thermal information and a thermal feedback signal; and
    an ETM control unit configured to receive the control signal from the ETM unit and perform the cooling operation on at least an electric motor of the electric vehicle using the control signal in view of an elevation change based on the geographical condition of the current route.

12. The system of claim 11, wherein the predicted thermal information includes at least one of: a predicted engine power signal of the electric vehicle and a predicted electrified power signal of the electric vehicle.

13. The system of claim 12, wherein the predicted engine power signal includes information about a future engine power demand needed by the electric vehicle using at least one of: navigational information, thermal information, and environment information.

14. The system of claim 12, wherein the predicted electrified power signal includes information about a future electrified power demand needed by the electric vehicle using at least one of: navigational information, thermal information, and environment information.

15. The system of claim 11, further comprising an electrification component monitoring unit configured to generate the thermal feedback signal including data representative of thermal information of at least the electric motor of the electric vehicle.

16. The system of claim 15, wherein the data is representative of a condition whether a current temperature of a corresponding component of the electric vehicle is equal to a target cooling temperature.

17. The system of claim 15, wherein the ETM control unit is configured to generate a status request signal that instructs the electrification component monitoring unit to perform a monitoring operation of at least the electric motor of the electric vehicle.

18. The system of claim 17, wherein the electrification component monitoring unit responds to the status request signal by collecting status information relating to at least the electric motor of the electric vehicle to assess an efficiency of the cooling operation.

19. The system of claim 18, wherein the electrification component monitoring unit is configured to generate the thermal feedback signal using the status information.

20. A method of performing a cooling operation for an electric vehicle using a processor, comprising:
generating predicted thermal information using look-ahead demand information representative of a future power demand including a predicted torque demand based on a geographical condition of a current route of the electric vehicle;
generating a control signal using the predicted thermal information and a thermal feedback signal; and
performing the cooling operation on at least an electric motor of the electric vehicle using the control signal in view of an elevation change based on the geographical condition of the current route.

21. The method of claim 20, further comprising including, in the predicted thermal information, at least one of: a predicted engine power signal of the electric vehicle and a predicted electrified power signal of the electric vehicle.

22. The method of claim 21, further comprising including, in the predicted engine power signal, information about a future engine power demand needed by the electric vehicle using at least one of: navigational information, thermal information, and environment information.

23. The method of claim 21, further comprising including, in the predicted electrified power signal, information about a future electrified power demand needed by the electric vehicle using at least one of: navigational information, thermal information, and environment information.

24. The method of claim 20, further comprising generating the thermal feedback signal using data representative of thermal information of at least the electric motor of the electric vehicle.

25. The method of claim 20, further comprising comparing a current temperature of a corresponding component of the electric vehicle with a target cooling temperature.

26. The method of claim 20, further comprising generating a status request signal that initiates a monitoring operation of at least the electric motor of the electric vehicle.

27. The method of claim 26, further comprising responding to the status request signal by collecting status information relating to at least the electric motor of the electric vehicle to assess an efficiency of the cooling operation.

28. The method of claim 27, further comprising generating the thermal feedback signal using the status information.

* * * * *